(12) United States Patent
Selvasekar et al.

(10) Patent No.: US 11,688,189 B2
(45) Date of Patent: Jun. 27, 2023

(54) ADDITIVE MANUFACTURING COUNTERFEITING OBFUSCATION

(71) Applicant: Ford Global Technologies, LLC, Dearborn, MI (US)

(72) Inventors: Siddharthan Selvasekar, Livermore, CA (US); Michael Steven Medoro, Sunnyvale, CA (US); Dylan Mandelbaum, Mountain View, CA (US); Sydney Puckett, Detroit, MI (US); Otis Allen, Soquel, CA (US); Andres Almeida Senatore, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 17/145,882

(22) Filed: Jan. 11, 2021

(65) Prior Publication Data

US 2022/0222468 A1 Jul. 14, 2022

(51) Int. Cl.
*B29C 64/393* (2017.01)
*G06V 20/80* (2022.01)
*B33Y 50/00* (2015.01)
*B33Y 10/00* (2015.01)
*B29C 64/153* (2017.01)
*B29C 64/112* (2017.01)
*B29C 64/124* (2017.01)

(52) U.S. Cl.
CPC ............ *G06V 20/80* (2022.01); *B29C 64/393* (2017.08); *B33Y 50/00* (2014.12); *B29C 64/112* (2017.08); *B29C 64/124* (2017.08); *B29C 64/153* (2017.08); *B33Y 10/00* (2014.12)

(58) Field of Classification Search
CPC .......... B22F 10/10; B22F 10/20; B22F 10/39; B29C 64/00; B29C 64/112; B29C 64/124; B29C 64/153; B29C 64/393; B33Y 10/00; B33Y 50/00; B33Y 50/02; G06V 20/80
See application file for complete search history.

(56) References Cited

U.S. PATENT DOCUMENTS 9,626,608 B2 4/2017 Bobbitt, III
9,937,656 B2 4/2018 Halla et al.
(Continued)

*Primary Examiner* — Yuhui R Pan
(74) *Attorney, Agent, or Firm* — Burris Law, PLLC

(57) ABSTRACT

A method of forming an additive manufactured part with obfuscated anti-counterfeiting features includes additive manufacturing the part using an approved additive manufacturing method and additive manufacturing a plurality of obfuscated anti-counterfeiting structures on a surface of the part using the approved additive manufacturing method. Each of the plurality of obfuscated anti-counterfeiting structures has at least one of a prohibitive physical dimension and a prohibitive physical shape that is prohibitive from being formed using at least one unapproved additive manufacturing method such that counterfeit manufacture of the part by the at least one unapproved additive manufacturing method is detected by inspecting the surface or observing a build failure by the at least one unapproved additive manufacturing method. The plurality of obfuscated anti-counterfeiting structures includes a plurality of hollow structures, a plurality of solid structures, and/or a plurality of truss structures.

20 Claims, 6 Drawing Sheets

(56) References Cited

U.S. PATENT DOCUMENTS

| | | |
|---|---|---|
| 10,239,264 B2 | 3/2019 | Levine et al. |
| 2012/0183701 A1 | 7/2012 | Pilz et al. |
| 2016/0307083 A1* | 10/2016 | Kumar ............... G05B 19/4099 |
| 2018/0303199 A1* | 10/2018 | Guyan ................... A43B 13/02 |

* cited by examiner

ADDITIVE MANUFACTURING COUNTERFEITING OBFUSCATION

FIELD

The present disclosure relates to additive manufacturing and preventing counterfeit additive manufactured parts.

BACKGROUND

The statements in this section merely provide background information related to the present disclosure and may not constitute prior art.

The manufacture and sale of counterfeit additive manufactured parts is of concern to original equipment manufacturers (OEMs) and consumers. For example, the manufacture of additive manufactured parts using inferior material(s) can lead to less than desired performance of such parts. And while digital file security methods have been and are currently being developed, such methods can be cost prohibitive.

The present disclosure addresses the issues of counterfeit additive manufacturing among other issues related to additive manufacturing of parts.

SUMMARY

This section provides a general summary of the disclosure and is not a comprehensive disclosure of its full scope or all of its features.

In one form of the present disclosure, a method of forming an additive manufactured part with obfuscated anti-counterfeiting features includes additive manufacturing the part using an approved additive manufacturing method and additive manufacturing a plurality of obfuscated anti-counterfeiting structures on a surface of the part using the approved additive manufacturing method. Each of the plurality of obfuscated anti-counterfeiting structures comprises at least one of a prohibitive physical dimension and a prohibitive physical shape that is prohibitive from being formed using at least one unapproved additive manufacturing method such that counterfeit manufacture of the part by the at least one unapproved additive manufacturing method is detected by inspecting the surface or observing a build failure by the at least one unapproved additive manufacturing method.

In some variations, the prohibitive physical dimension is at least one of an average inner dimension of the plurality of obfuscated anti-counterfeiting structures, an average outer dimension of the plurality of obfuscated anti-counterfeiting structures, an average spacing between the plurality of obfuscated anti-counterfeiting structures, an average height of the plurality of obfuscated anti-counterfeiting structures, an average width of the plurality of obfuscated anti-counterfeiting structures, an average length of an unsupported section of the plurality of obfuscated anti-counterfeiting structures, and an average overhang angle of an unsupported section of the plurality of obfuscated anti-counterfeiting structures.

In at least one variation, the plurality of obfuscated anti-counterfeiting structures is a plurality of hollow structures, the approved additive manufacturing method is one of multi jet fusion, selective laser sintering, fused filament fabrication, direct metal laser melting, binder jetting, and material jetting, and the unapproved additive manufacturing method is one of continuous liquid interface production and stereolithography. In such variations, the plurality of hollow structures have a prohibitive physical dimension in the form of an average inner dimension between about 1 mm and about 5 mm. And in some variations, the plurality of hollow structures is at least one of a plurality of hollow spheres, a plurality of hollow cylinders, a plurality of hollow cones, and a plurality of hollow polyhedral. In at least one variation the plurality of hollow structures have a prohibitive physical dimension in the form an average wall thickness between about 1 mm and about 5 mm.

In some variations, the plurality of obfuscated anti-counterfeiting structures is a plurality of solid structures, the approved additive manufacturing method is one of multi jet fusion, fused filament fabrication, binder jetting, and material jetting, and the unapproved additive manufacturing method is selective laser sintering and direct metal laser melting. In such variations, the plurality of solid structures have a prohibitive physical dimension in the form average an outer dimension between about 5 mm and about 10 mm. And in some variations the plurality of solid structures is at least one of a plurality of solid spheres, a plurality of solid cylinders, a plurality of solid cones, and a plurality of solid polyhedra. In at least one variation the plurality of solid structures have a prohibitive physical dimension in the form an average spacing between adjacent solid structures between about 5 mm and about 25 mm.

In some variations, the plurality of obfuscated anti-counterfeiting structures is a plurality of truss structures, the approved additive manufacturing method is multi jet fusion, selective laser sintering, stereolithography, binder jetting, high speed sintering, direct metal laser melting, and the unapproved additive manufacturing method is fused filament fabrication, stereolithography, and direct metal laser melting. And in some variations the plurality of truss structures have a prohibitive physical dimension in the form an average outer dimension between about 1 mm and about 3 mm. In at least one variation the plurality of obfuscated anti-counterfeiting structures comprises at least two of a plurality of hollow structures, a plurality of solid structures, and a plurality of truss structures. In some variations, the unapproved additive manufacturing method is at least two unapproved additive manufacturing methods and the plurality of obfuscated anti-counterfeiting structures is a plurality of hollow structures and a plurality of truss structures.

In at least one variation the surface of the part is a B-surface of the part.

In another form of the present disclosure, a method of forming additive manufactured parts with obfuscated anti-counterfeiting features includes additive manufacturing a plurality of parts using an approved additive manufacturing method by forming a plurality of obfuscated anti-counterfeiting structures on a surface of each of the plurality of parts. Each of the plurality of obfuscated anti-counterfeiting structures includes at least one of a prohibitive physical dimension and a prohibitive physical shape that is prohibitive from being formed using at least one unapproved additive manufacturing method such that counterfeit manufacture of the plurality of parts by the at least one unapproved additive manufacturing method is detected by inspecting the surface of each of the plurality of parts or observing a build failure by the at least one unapproved additive manufacturing method.

In some variations, the plurality of obfuscated anti-counterfeiting structures is at least one of a plurality of hollow structures with a prohibitive physical dimension in the form of an average inner dimension between about 1 mm and about 5 mm, a plurality of solid structures with a prohibitive physical dimension in the form an average outer dimension between about 5 mm and about 10 mm, and a plurality of truss structures with a prohibitive physical dimension in the form an average outer dimension between about 5 mm and about 10 mm. And in at least one variation the surface of each of the plurality of parts is a B-surface.

In still another form of the present disclosure, a method of forming additive manufactured parts with obfuscated anti-counterfeiting features includes additive manufacturing a plurality of parts using at least one approved additive manufacturing method such that each of the plurality of parts has a surface with a plurality of obfuscated anti-counterfeiting structures. In some variations, the plurality of obfuscated anti-counterfeiting structures includes at least two of a plurality of hollow structures, a plurality of solid structures, and a plurality of truss structures. Also, each of the plurality of obfuscated anti-counterfeiting structures includes at least one of a prohibitive physical dimension and a prohibitive physical shape that is prohibitive from being formed using at least one unapproved additive manufacturing method such that counterfeit manufacture of the plurality of parts using at least two unapproved additive manufacturing methods is detected by inspecting the surface or observing a build failure by the at least one unapproved additive manufacturing method.

In some variations, the plurality of obfuscated anti-counterfeiting structures is at least two of a plurality of hollow structures with a prohibitive physical dimension in the form an average inner dimension between about 1 mm and about 5 mm, a plurality of solid structures with a prohibitive physical dimension in the form an average outer dimension between about 5 mm and about 10 mm, and a plurality of truss structures with a prohibitive physical dimension in the form an average outer dimension between about 5 mm and about 10 mm.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
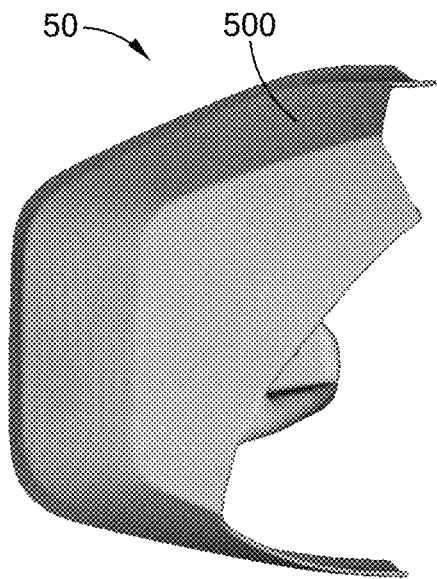
FIG. 1A is a perspective view of a component formed by additive manufacturing.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a method for additive manufacturing a part with anti-counterfeit structures or features that inhibit manufacture of the part using unapproved manufacturing techniques. For example, the method includes additive manufacturing (AM) a part using an approved AM method such that the part has at least one surface with a plurality of obfuscated anti-counterfeiting structures (also referred to herein simply as "obfuscated anti-counterfeiting structures") that are properly formed with the approved AM method but cannot be properly formed with an unapproved AM method. Accordingly, AM of the part using an unapproved AM method can be detected by inspecting the at least one surface of the part and determining whether or not a plurality of obfuscated anti-counterfeiting structures are present on the surface, and if present, are the obfuscated anti-counterfeiting structures properly formed. If the plurality of obfuscated anti-counterfeiting structures are not present, than an original equipment manufacturer (OEM) or approved contractor of the OEM is alerted that the part has been manufactured by an unauthorized entity. Also, if the plurality of obfuscated anti-counterfeiting structures are present on the at least one surface and are not properly formed (i.e., defects are present), then the OEM is alerted that the part has been manufactured by an unauthorized entity. In the alternative, or in addition to, AM of the part using an unapproved AM method can be detected by observing a build failure by the at least one unapproved additive manufacturing method.

As used herein, the phrase "approved AM method" refers to an AM method or technique that is specified, certified and/or approved by an original equipment manufacturer (OEM) for the manufacture of one or more parts, and the phrase "unapproved AM method" refers to an AM method or technique that is not specified, certified and/or approved by an OEM for the manufacture of the same one or more parts. Also, the phrase "obfuscated anti-counterfeiting structures" refers to a plurality of structures on a surface of a given AM part that can be properly formed using an approved AM method(s) to form the AM part but cannot be properly formed using an unapproved AM method(s). And as used herein, the phrase "properly formed" refers to structures that are formed with an approved AM method and meet specifications and/or tolerances of the part required by the OEM as established or set forth under a Part Production Approval Process (PPAP) for the part.

In some variations, each of the plurality of obfuscated anti-counterfeiting structures has at least one of a physical dimension and a physical shape that is properly formed using an approved AM method but is prohibitive from being formed using an unapproved AM method as described in greater below. Accordingly, the present disclosure provides a method of ensuring authorized AM of parts. As used herein, the phrase "prohibitive from being formed" refers to a structure, a physical dimension of the structure and/or a physical shape of the structure that cannot be properly formed using a given AM method.

Figure 1B:
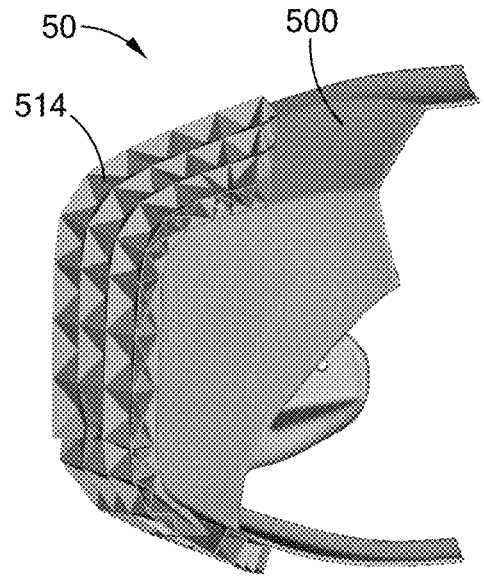
FIG. 1B is a perspective view of the component in FIG. 1A with obfuscated anti-counterfeit structures on a surface of the component according to one form of the present disclosure.
Figure 1C:
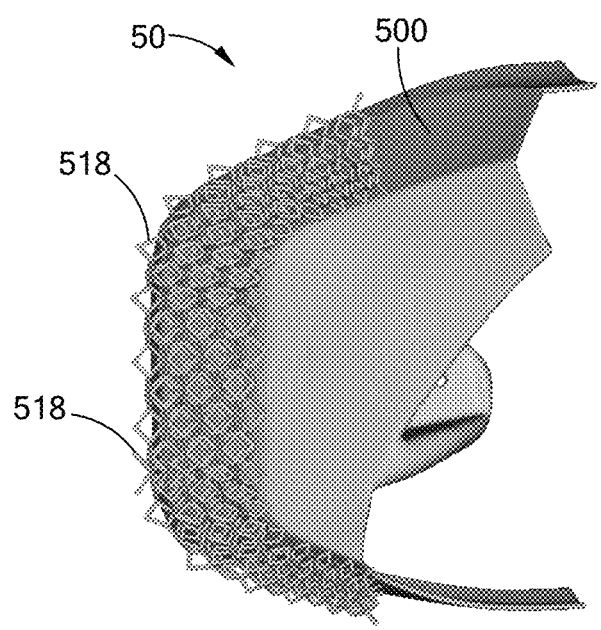
FIG. 1C is a perspective view of the component in FIG. 1A with obfuscated anti-counterfeit structures on a surface of the component according to another form of the present disclosure.

Referring to FIGS. 1A-1C, FIG. 1A shows a perspective view of an AM part 50 with a surface 500 that does not have obfuscated anti-counterfeiting structures and FIGS. 1B-1C show two non-limiting examples of parts with obfuscated anti-counterfeiting structures. Particularly, FIG. 1B shows the AM part 50 in FIG. 1A with obfuscated anti-counterfeiting structures in the form of hollow structures 514 formed on the surface 500. And FIG. 1C shows the AM part 50 in FIG. 1A with obfuscated anti-counterfeiting structures in the form of truss structures 518 formed on the surface 500.

The hollow structures 514 illustrated in FIG. 1B are properly formed with approved AM methods such as multi jet fusion, fused filament fabrication, material jetting, selective laser sintering, binder jetting, and direct metal laser melting (assuming the part is made from a metallic material) such that the hollow structures 514 do not have or exhibit structural defects such as cupping. However, the hollow structures 514 are not properly formed with unapproved AM methods such as continuous liquid interface production and stereolithography. That is, the hollow structures 514 formed using AM methods such as continuous liquid interface production or stereolithography will have or exhibit structural defects such as capping and/or delamination from the surface 500 due to negative pressure within the hollow structures 514.

The truss structures 518 illustrated in FIG. 1C are properly formed with approved additive manufacturing method such as multi jet fusion, selective laser sintering, and binder jetting such that the truss structures 518 do not have or exhibit structural defects such as sagging. However, the truss structures 518 are not properly formed with unapproved AM methods such as stereoligraphy, continuous liquid interphase production, fused filament fabrication and direct metal laser melting. That is, the truss structures 518 formed using AM methods such as fused filament fabrication or direct metal laser melting will have or exhibit structural defects such as sagging and/or delamination from the surface 500.

In some variations, the part 50 is an automotive part, e.g., a part for an interior or engine compartment of a motor vehicle. It should be understood that the part 50 can be manufactured using different AM methods with at least one AM method being desired for forming the part 50 due to chemical, physical, and/or mechanical properties of the properly formed part 50. Stated differently, geometric freedoms available via AM provide an additional functionality of embedding specific design features in a part that increase the difficulty of counterfeit manufacturing the part using an uncertified (i.e., unapproved) AM method. In addition, the specific design features are tailored to negatively impact the manufacture of parts using unapproved AM methods. However, AM the parts using an approved AM method provides for a part with aspects such as weight, performance, and cost being changed within an acceptable amount or degree.

In order to better illustrate the teachings of the present disclosure, a non-limiting summary or review of AM methods that can be approved AM methods and/or unapproved AM methods, depending on design features of a part, are discussed below.

Figure 2A:
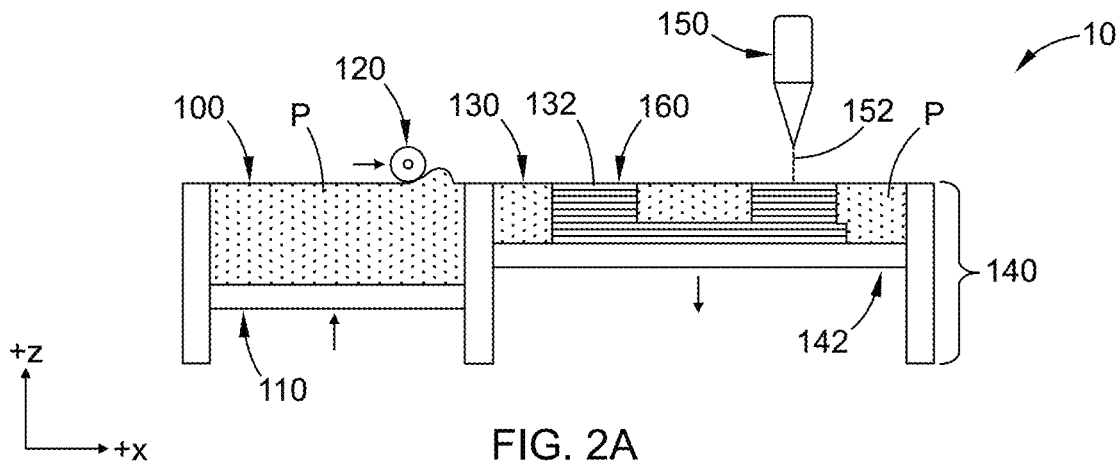
FIG. 2A is a side view of a binder jetting system according to one form of the present disclosure.
Figure 2B:
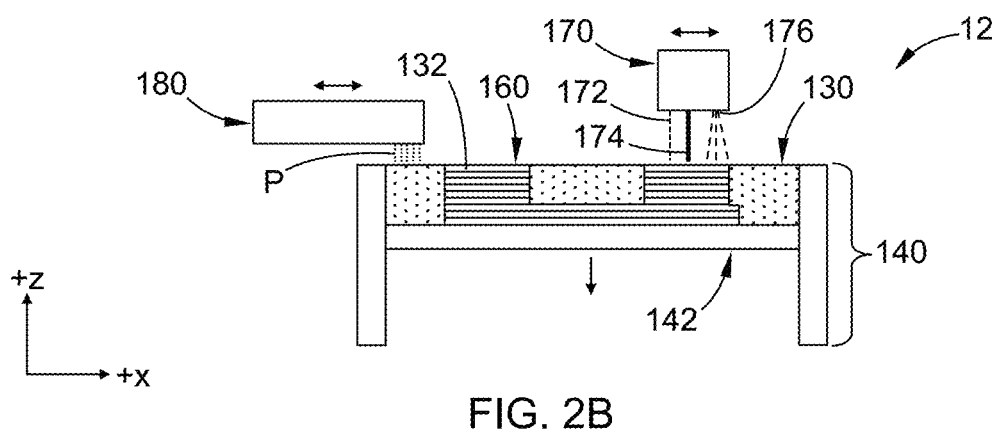
FIG. 2B is a side view of a material jetting system according to the teachings of the present disclosure.
Figure 2C:
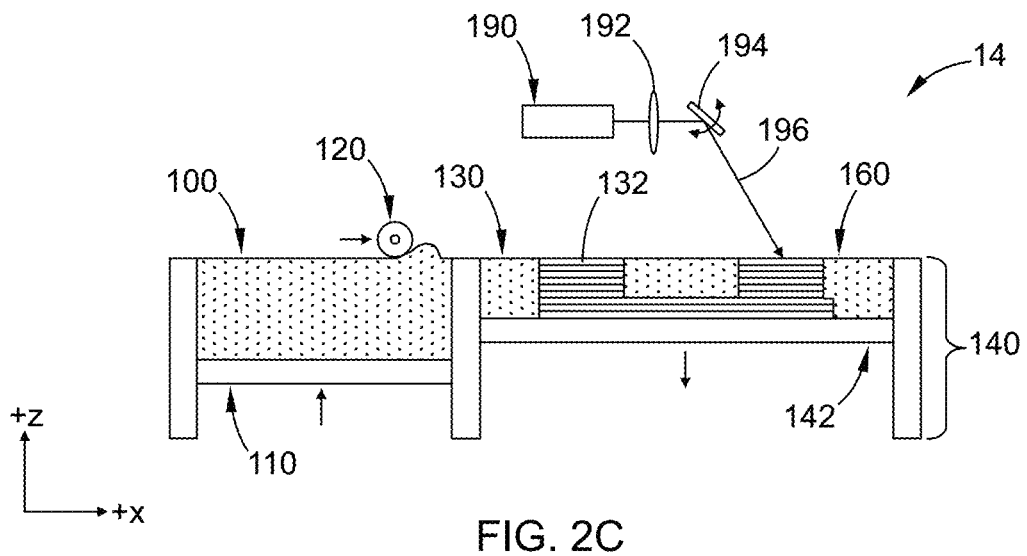
FIG. 2C is a side view of a selective laser sintering and/or direct metal laser meting system according to the teachings of the present disclosure.
Figure 2D:
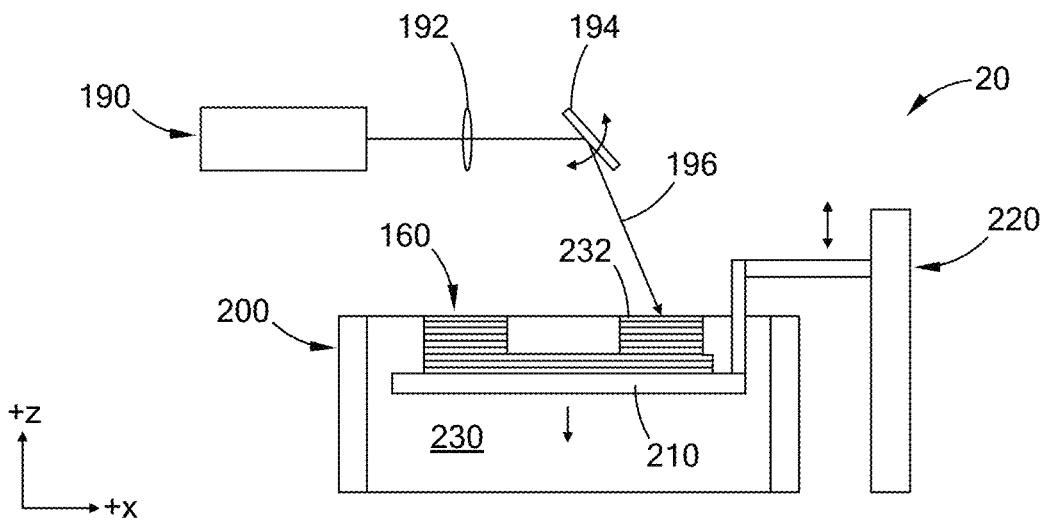
FIG. 2D is a side view of a stereolithography system according to the teachings of the present disclosure.
Figure 2E:
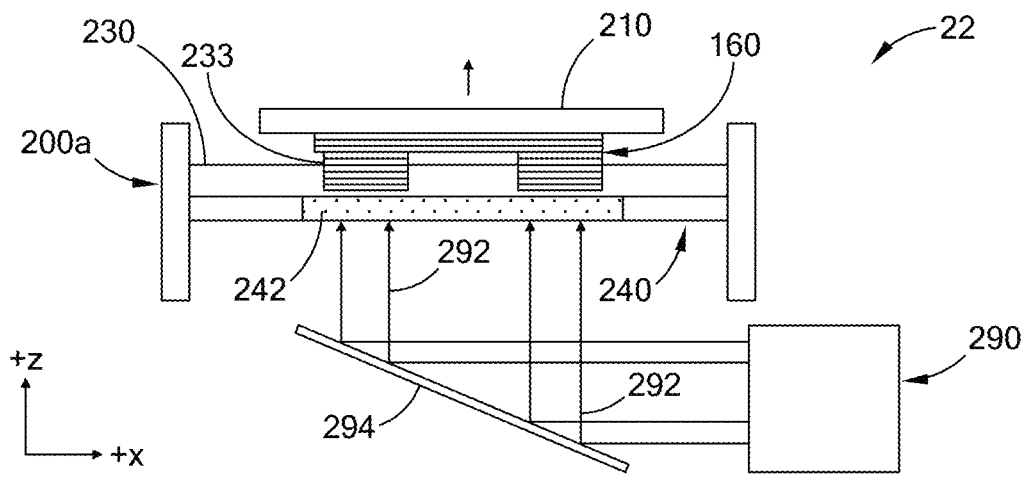
FIG. 2E is a side view of a continuous liquid interface production according to the teachings of the present disclosure.
Figure 2F:
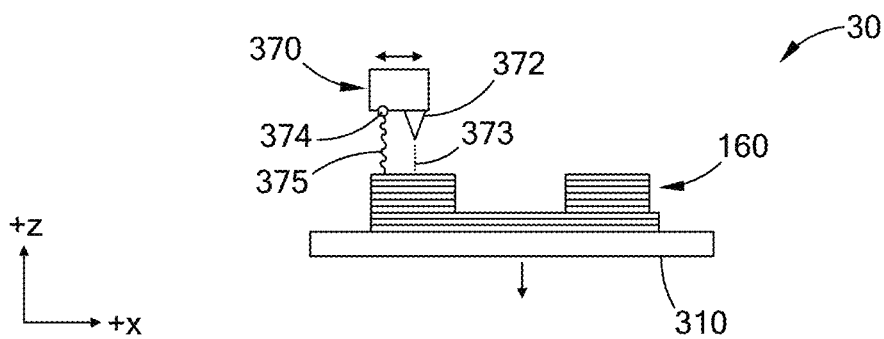
FIG. 2F is a side view of a material jetting system according to the teachings of the present disclosure.
Figure 2G:
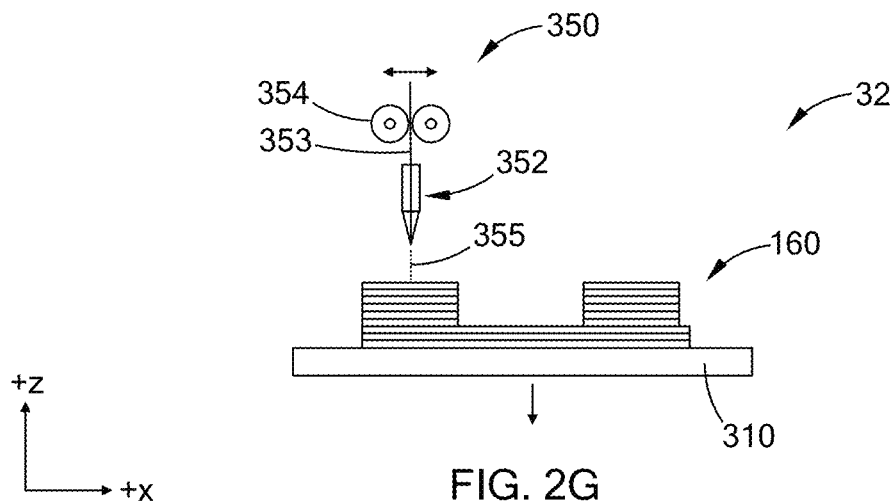
FIG. 2G is a side view of fused filament fabrication system according to the teachings of the present disclosure.

Referring now to FIGS. 2A-2G, non-limiting examples of AM methods that are approved AM methods, or in the alternative, unapproved AM methods depending on the design features of a given part are shown. Particularly, FIGS. 2A-2C show systems that use or employ at least one bed of powder during AM of parts, FIGS. 2D-2E show systems that use or employ a liquid bath during AM of parts, and FIGS. 2F-2G show systems that use or employ deposition devices to deposit layers of material onto previously deposited layers during AM of parts.

Referring particularly to FIG. 2A, a system 10 for AM a part 160 via binder jetting (BJ) is shown. The system 10 includes a first powder bed 100 on a first elevator platform 110 and a powder roller 120 configured to transfer powder 'P' from the first powder bed 100 to a second powder bed 130 that is part of or contained within a build box 140 that includes a second elevator platform 142. A binder nozzle 150 (e.g., an inkjet print head) is included and configured to move and deposit a liquid binder 152 at desired or selected locations across an upper surface 132 of the powder bed 130. The desired or selected locations of the upper surface 132 with liquid binder 152 form a layer (e.g., a first layer—not labeled) of the part 160. After the first layer is formed, the second elevator platform 142 moves downward (−z direction) and the powder roller 120 transfers powder P from the first powder bed 100 to the second powder bed 130 and spreads a thin layer (not labeled) of the powder P across the previously formed first layer of the part 160. Then the binder nozzle 150 moves across the powder bed 130 and deposits the liquid binder 152 at desired or selected locations across the upper surface 132 of the powder bed 130 to form a second layer (not labeled) of the part 160. This cycle, i.e., powder—binder—powder—binder, continues until the part 160 is formed layer by layer. In some variations the part 160 is subjected to additional processing such as depowdering, washing, and sintering, among others.

It should be understood that BJ AM can be used to form hollow structures without the presence of "cupping" defects (i.e., a depression in the wall of a hollow structure) and solid structures without warpage and/or shrinkage. Accordingly, BJ AM can be an approved AM method for forming parts with at least one surface having obfuscated anti-counterfeiting structures in the form of hollow structures (e.g., the part 50 shown in FIG. 1B) and/or solid structures.

FIG. 2B shows a system 12 for AM the part 160 via multi jet fusion (MJF). The system 12 includes the second powder bed 130 on the second elevator platform 142 and a material recoating unit 180 configured to apply powder 'P' over the powder bed 130 in the build box 140. A printer head 170 with an inkjet array 172 (only one inkjet shown), a fusing and detailing agent array 174 (only one shown), and an energy unit 176 (e.g., a thermal energy unit or an ultraviolet light energy unit), is included. The printer head 170 is configured to move and deposit a liquid binder via the inkjet array 172 and/or fusing and detailing agents via the fusing and detailing agent array 174 at desired or selected locations across an upper surface 132 of the powder bed 130. In addition, the desired or selected locations of the upper surface 132 with liquid binder and/or fusing and detailing agents form a layer (e.g., a first layer—not labeled) of the part 160 that is cured via exposure to or irradiation from the energy source 176. After the first cured layer is formed, the second elevator platform 142 moves downward (−z direction) and the material recoating unit 180 provides or deposits a thin layer of powder P across the previously formed first cured layer of the part 160. Then the printer head 170 moves across the powder bed 130 and deposits the liquid binder and/or fusing and detailing agents at desired or selected locations across the upper surface 132 of the powder bed 130 to form a second layer (not labeled) of the part 160 which is subsequently cured via exposure to or irradiation from the energy source 176. This cycle, i.e., powder—binder/agents—cure—powder—binder/agents—cure, continues until the entire part 160 is formed layer by layer.

It should be understood that MJF AM can be used to form hollow structures without cupping and solid structures without warpage and/or shrinkage. Accordingly, MJF AM can be an approved AM method for forming parts with at least one surface having obfuscated anti-counterfeiting structures in the form of hollow structures (e.g., the part 50 shown in FIG. 1B) and/or solid structures.

FIG. 2C shows a system 14 for additively manufacturing the part 160 via selective laser sintering (SLS) or direct metal laser melting (DMLM). Similar to the system 10 discussed above with respect to FIG. 1A, the system 12 includes a first powder bed 100 on a first elevator platform 110 and a powder roller 120 configured to transfer powder from the first powder bed 100 to the second powder bed 130 on the second elevator platform 142 in the build box 140. However, instead of a binder nozzle 150 as described above with respect to FIG. 2A, a laser source 190 is included and configured to provide a laser beam 196 that propagates and impinges or irradiates desired or selected locations across an upper surface 132 of the powder bed 130. In some variations laser optics 192 and a scanning mirror 194 are included and configured to direct the laser beam 196 to the desired or selected locations across the upper surface 132 of the powder bed 130. The desired or selected locations of the upper surface 132 are sintered, or melt and solidify, to form a layer (e.g., a first layer—not labeled) of the part 160. After the first layer is formed, the second elevator platform 142 moves downward (−z direction) and the powder roller 120 transfers powder P from the first powder bed 100 to the second powder bed 130 and spreads a thin layer of the powder P across the previously formed first layer of the part 160. Then the laser beam 196 is directed across the powder bed 130 at desired or selected locations along or over the upper surface 132 of the powder bed 130 to form a second layer (not labeled) of the part 160. This cycle, i.e., powder—laser—powder—laser, continues until the entire part 160 is formed layer by layer.

It should be understood that SLS AM and/or DMLM AM can be used to form hollow structures without cupping. However, heat input during SLS AM and/or DMLM AM and cooling after the sintering and/or melting of the metal powder inhibits these AM methods from being used to form solid structures without warpage and/or shrinkage. Accordingly, SLS AM and/or DMLM AM can be an approved AM method for forming parts with at least one surface having obfuscated anti-counterfeiting structures in the form of hollow structures (e.g., the part 50 shown in FIG. 1B). However, SLS AM and/or DMLM AM can be an unapproved AM method for forming solid structures.

FIG. 2D shows a system 20 for additively manufacturing the part 160 via stereolithography (SLA). The system 20 includes a build tank 200 with a build platform 210 mechanically coupled to an elevator 220 configured to move the build platform 210 in a vertical direction (+/−z direction). A liquid bath 230 comprising monomers and oligomers is disposed within the build tank 200 and a light emitting device 190 (e.g., a laser source) is included and configured to provide and propagates a light 196. In some variations laser optics 192 and a scanning mirror 194 are included and configured to direct the light 196 to desired or selected locations across an upper surface 232 of the liquid bath 230. When the desired or selected locations of the upper surface 232 irradiated with the light 196, the monomers and oligomers are cross-linked via photochemical processes such that a solid layer (e.g., a first layer—not labeled) of the part 160 is formed. After the first layer is formed, the elevator 220 moves the build platform 210 downward (−z direction) such that a layer of the liquid bath 230 covers the first layer and the light 196 is directed to desired or selected locations across the upper surface 232 of the liquid bath 230 to form a second layer (not labeled) of the part 160. This cycle, i.e., liquid layer—light scan—liquid layer—light scan, continues until the entire part 160 is formed layer by layer.

It should be understood that SLA AM can be used to form solid structures. However, SLA AM is inhibited from being used to form hollow structures without cupping and truss structures with sagging. Accordingly, SLA AM can be an approved AM method for forming parts with at least one surface having obfuscated anti-counterfeiting structures in the form of solid structures, but SLA AM can be an unapproved AM method for forming hollow structures and truss structures.

FIG. 2E shows a system 22 for additively manufacturing the part 160 via continuous liquid interface production (CLIP). The system 22 includes a build tank 200a with a liquid photopolymer resin 230 disposed therein and a bottom 240 with a window portion 242 that is oxygen permeable and light transparent. A light emitting device 290 (e.g., an ultraviolet light source) is included and configured to provide and propagates a light 292 (e.g., ultraviolet light). In some variations a mirror 294 is included to direct the light 292 through the window portion 242 at desired or selected locations across a lower surface 233 of the liquid photopolymer resin 230. The light 292 results in the solidification of the photopolymer resin 230 on a build platform 210 at the desired or selected locations. Also, the build platform 210 moves upwardly (+z direction) at a desired speed such that the liquid photopolymer resin 230 flows under and maintains contact with the bottom (−z direction) of the part 160 being formed. And the oxygen permeable window portion 242 results in a persistent liquid interface between the window portion 242 and the part 160 being formed such that solidified photopolymer resin 230 does not attach to the window portion 242.

It should be understood that CLIP AM can be used to form solid structures. However, CLIP AM is inhibited from being used to form hollow structures without cupping and truss structures without sagging. Accordingly, CLIP AM can be an approved AM method for forming parts with at least one surface having obfuscated anti-counterfeiting structures in the form of solid structures, but can be an unapproved AM method for forming hollow structures and truss structures.

FIG. 2F shows a system 30 for additively manufacturing the part 160 via multi jetting (MJ). The system 30 includes a build platform 310 and a print head 370 with a material nozzle 372 configured to deposit liquid material 373 (e.g., liquid photopolymer resin) at desired or selected locations across the build platform 310. The print head 370 also includes a light source 374 (e.g., an ultraviolet light source)

configured to irradiate the desired or selected locations across the build platform 310 with light 375 (e.g., ultraviolet light). The light 375 cures or results in the solidification of the liquid material 373 deposited at the desired or selected locations across the build platform 310 such that a layer (e.g., a first layer—not labeled) of the part 160 is formed. After the first layer is formed, the build platform 310 moves downward (−z direction) and the material nozzle 372 deposits another layer (e.g., a second layer—not labeled) of liquid material 373 across the previously formed first layer at desired or selected locations. Then the light 375 irradiates and cures or solidifies the second layer of liquid material 373 to form a second layer (not labeled) of the part 160. This cycle, i.e., liquid—irradiation—liquid—irradiation, continues until the entire part 160 is formed layer by layer.

It should be understood that MJ AM can be used to form hollow structures and solid structures. However, MJ AM is inhibited from being used to form truss structures without sagging. Accordingly, MJ AM can be an approved AM method for forming parts with at least one surface having obfuscated anti-counterfeiting structures in the form of hollow and/or solid structures, but can be an unapproved AM method for forming truss structures.

FIG. 2G shows a system 32 for additively manufacturing the part 160 via fused filament fabrication (FFF). The system 32 includes the build platform 310 and an extrusion print head 350 with a heater 352 and at least one drive roller 354. Filament 353 is fed from a spool (not shown) using the at least one drive roller 354 and the heater 352 heats the filament 353 such that liquid droplets 355 of the filament 353 are deposited at desired or selected locations across the build platform 310, cool, and solidify such that a layer (e.g., a first layer—not labeled) of the part 160 is formed. After the first layer is formed, the build platform 310 moves downward (−z direction) and the extrusion print head 350 deposits another layer (e.g., a second layer—not labeled) of liquid droplets 355 across the previously formed layer at desired or selected locations. This cycle, i.e., liquid layer—solidification—liquid layer—solidification, continues until the entire part 160 is formed layer by layer.

It should be understood that FFF AM can be used to form hollow structures and solid structures. However, FFF AM is inhibited from being used to form truss structures with overhanging sections. Accordingly, FFF AM can be an approved AM method for forming parts with at least one surface having obfuscated anti-counterfeiting structures in the form of hollow and/or solid structures, but can be an unapproved AM method for forming truss structures according to the teachings of the present disclosure.

Figure 3:
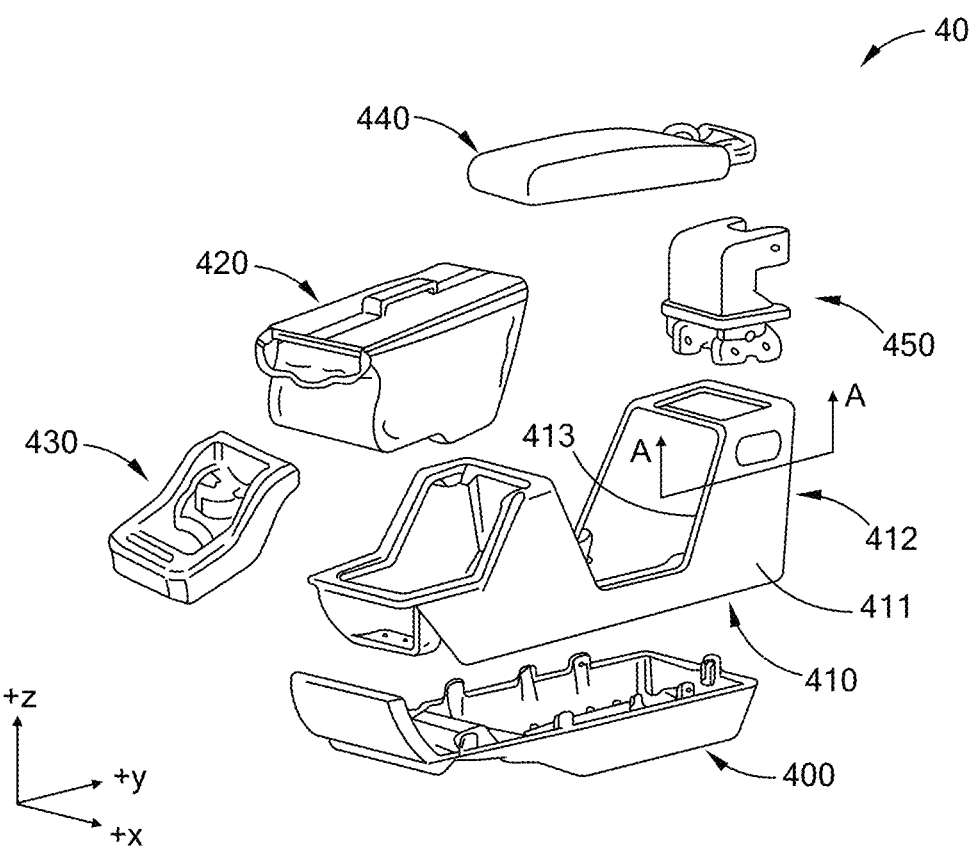
FIG. 3 is a perspective exploded view of a center console assembly for a motor vehicle.

Referring now to FIG. 3, additional examples of parts that can be formed using AM methods are shown. Particularly, an exploded view of a center console assembly 40 having a lower section 400, a main body section 410, a storage container 420, a coin storage part 430, an armrest 440 and a bracket 450 is shown. In some variations, one or more of the parts of the center console assembly are formed using an approved AM method as described below.

Figure 4:
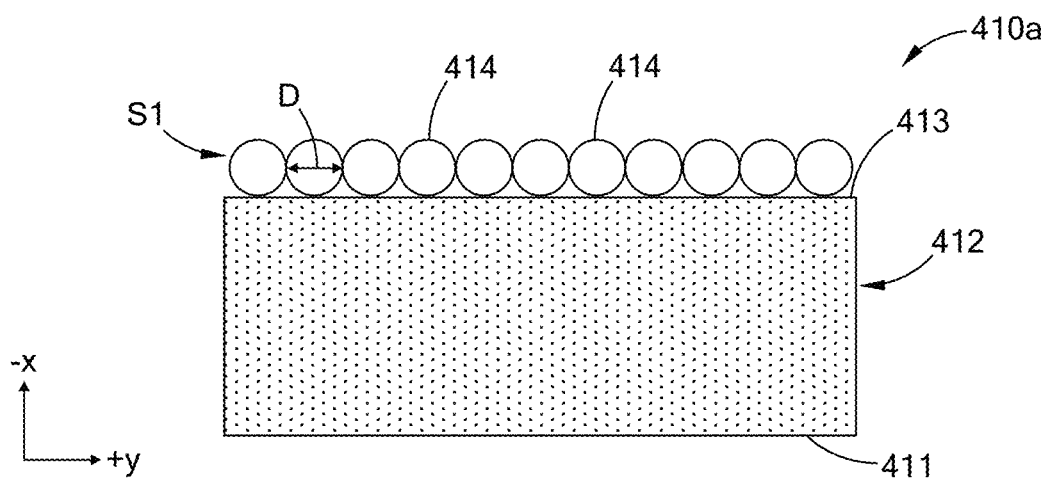
FIG. 4 is a sectional view of section A-A in FIG. 3 according to one form of the present disclosure.

For example, and with reference to FIG. 4, a sectional view of section A-A of the main body section 410 in FIG. 3 is shown. The main body section 410 has a sidewall 412 with an outer surface 411 (+x direction) and an inner surface 413 (−x direction). In some variations, the outer surface 411 is an 'A' surface and the inner surface 413 is a 'B' surface. As used herein, the term "A surface" refers to a surface of a part that is visible and should be aesthetically pleasing to an individual that has purchased and/or uses the part and the term "B surface" refers to a surface of component that is not visible to an individual that has purchased and/or uses the part.

As shown in FIG. 4, a plurality of hollow structures 414 (also referred to herein simply as "hollow structures 414") have been AM on the inner surface 413 of the sidewall 412 with an approved AM method such as multi jet fusion, selective laser sintering, fused filament fabrication, direct metal laser melting, binder jetting, and material jetting. Accordingly, the hollow structures 414 do not have or exhibit any cupping and/or delamination from the inner surface 413. In addition, the hollow structures 414 each have a prohibitive shape 'S1' and/or a prohibitive physical dimension 'D.' As used herein, the phrase "prohibitive shape" refers to a shape that is properly made (i.e., without defects such as cupping, warping, shrinking, among others) with an approved AM method but is improperly made with an unapproved AM method (i.e., with defects such as cupping, warping, shrinking, among others). And as used herein, the phrase "prohibitive physical dimension" refers to a physical dimension such as a length, width, depth, or angle of orientation relative to a surface, among others, of an additive manufactured structure that is properly produced (e.g., without sagging, cupping, warping, among others) with an approved AM method but is improperly made with an unapproved AM method (e.g., with sagging, cupping, warping, among others). In some variations, the prohibitive shape S1 is a hollow sphere as shown in FIG. 4, while in other variations the prohibitive shape S1 is a hollow cylinder, a hollow cone, or a hollow polyhedral (e.g., see FIG. 1B). And in some variations, the prohibitive physical dimension D can be an average inner dimension between about 1 millimeter (mm) and about 5 mm and/or an average wall thickness between about 1 mm and about 5 mm.

Figure 5:
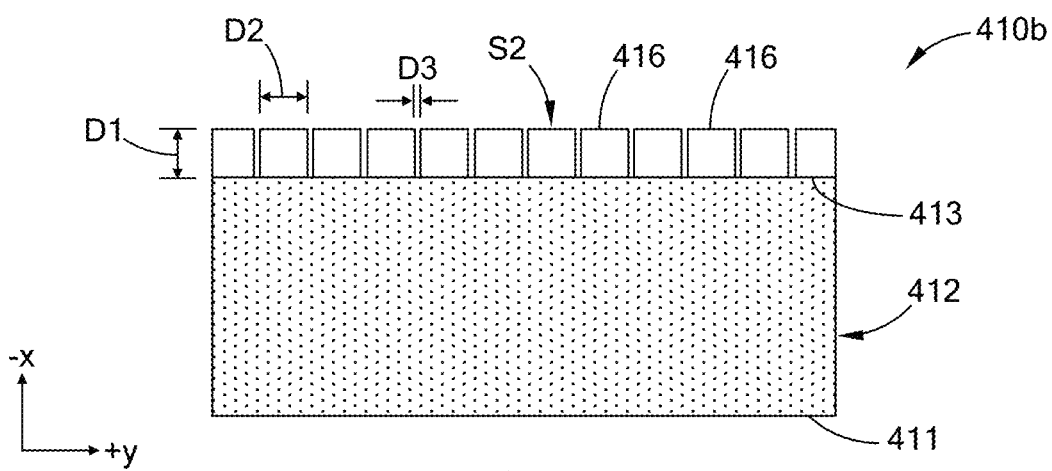
FIG. 5 is a sectional view of section A-A in FIG. 3 according to another form of the present disclosure.

Referring to FIG. 5, a sectional view of section A-A in FIG. 3 is shown with a plurality of solid structures 416 (also referred to herein simply as "solid structures 416") AM on the inner surface 413 of the sidewall 412. Also, the solid structures 416 do not have or exhibit warping and/or are not delaminated from the inner surface 413. Accordingly, the solid structures 416 have been additively manufactured with an approved AM method such as multi jet fusion, fused filament fabrication, binder jetting, and material jetting, and not additively manufactured with an unapproved AM method such as selective laser sintering and direct metal laser melting. In addition, the solid structures 416 each have a prohibitive shape 'S2' and/or at least one prohibitive physical dimension 'D2', and/or 'D3'. In some variations, the prohibitive shape S2 is a solid cube as shown in FIG. 5, while in the other variations the prohibitive shape S2 is a solid sphere, a solid cylinder, a solid cone, or a solid polyhedral, among others. Also, in some variations the prohibitive physical dimensions D1 and D2 are average outer dimensions of the solid structures 416 and the prohibitive physical dimension D3 is an average spacing between the solid structures 416. For example, in some variations the prohibitive physical dimensions D1 and D2 are between about 5 mm and about 10 mm, and the prohibitive physical dimension D3 (i.e., an average spacing between the solid structures 416) is between about 5 mm and about 25 mm.

Figure 6:
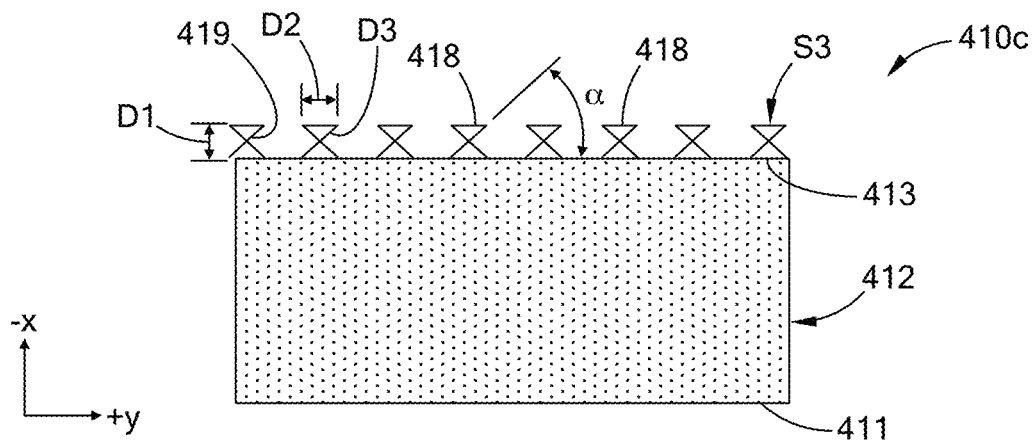
FIG. 6 is a sectional view of section A-A in FIG. 3 according to still another form of the present disclosure.

Referring to FIG. 6, a sectional view of section A-A in FIG. 3 is shown with a plurality of truss structures 418 (also referred to herein simply as "truss structures 418") AM on the inner surface 413 of the sidewall 412. Also, the truss structures 418 do not have or exhibit sagging at regions or sections 419 of the truss structures 418 that are unsupported.

Accordingly, the truss structures 418 have been additively manufactured with an approved AM method such as multi jet fusion, selective laser sintering, stereolithography, binder jetting, high speed sintering, direct metal laser melting, and not additively manufactured with an unapproved AM method such as fused filament fabrication, stereolithography, and direct metal laser melting. In addition, the truss structures 418 each have a prohibitive shape 'S3' and at least one prohibitive physical dimension 'D2', 'D3', and/or 'α'.

In some variations, the prohibitive shape S3 is a cross-shaped truss structure as shown in FIG. 6, while in the other variation the prohibitive shape S3 is a single linear segment, two linear segments, or three linear segments attached to and extending outwardly (−x direction) from the inner surface 413, among others. Also, in some variations the prohibitive physical dimensions D1 and D2 are an average height (−x direction) and an average width (y direction), and the prohibitive physical dimension D3 is an average length of an unsupported section of the truss structures 418.

In at least one variation, the prohibitive physical dimensions D1 and D2 are between about 1 mm and about 3 mm, the prohibitive physical dimension D3 (i.e., the length or unsupported overhang) is between about 0.5 mm and about 1.5 mm, and the prohibitive physical dimension a (i.e., an average overhang angle between the unsupported length of the truss structure and the inner surface 413) is less than a predefined angle. For example, in some variations the unapproved AM method is fused filament fabrication and the prohibitive physical dimension a is any angle less than about 45°, i.e., the prohibitive physical dimension a is about 45°. Stated differently, truss structures 418 with unsupported sections 419 having an overhang angle of less than 45° are prohibitive from being formed using fused filament fabrication. In other variations the unapproved AM method is direct metal laser melting and the prohibitive physical dimension a is about 30°. And in at least one variation the unapproved AM method is stereolithography and the prohibitive physical dimension a is about 20°.

While FIG. 6 shows a plurality of truss structures 418 with the prohibitive dimension a, it should be understood that other types structures can have a prohibitive physical dimension a. For example, hollow structures with at least a portion or section having an overhang angle α and solid structures with at least a portion or section having an overhang angle α are included within the teachings of the present disclosure.

Figure 7:
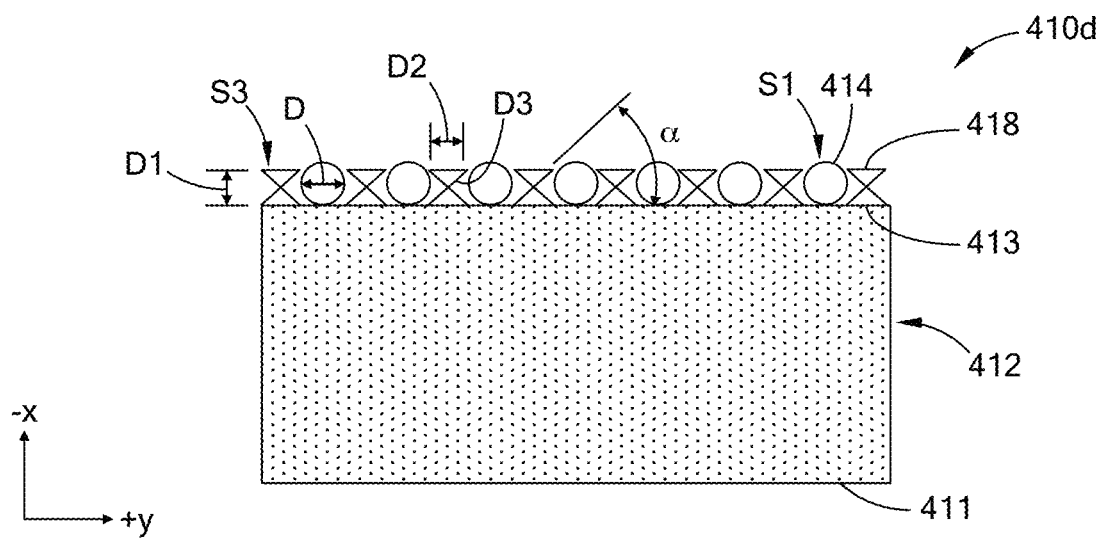
FIG. 7 is a sectional view of section A-A in FIG. 3 according to yet another form of the present disclosure.

Referring to FIG. 7, a sectional view of section A-A in FIG. 3 is shown with a plurality of hollow structures 414 and a plurality of truss structures 418 AM on the inner surface 413 of the sidewall 412. Also, the hollow structures 414 do not have or exhibit any cupping and the truss structures 418 do not have or exhibit sagging at regions or areas of the truss structures 418 that are unsupported. Accordingly, the hollow structures 414 and the truss structures 418 have been additively manufactured with an approved AM method such as multi jet fusion, selective laser sintering, direct metal laser melting, binder jetting, and not additively manufactured with unapproved AM methods such as, fused filament fabrication, direct metal laser melting, continuous liquid interface production, and stereolithography.

Figure 8:
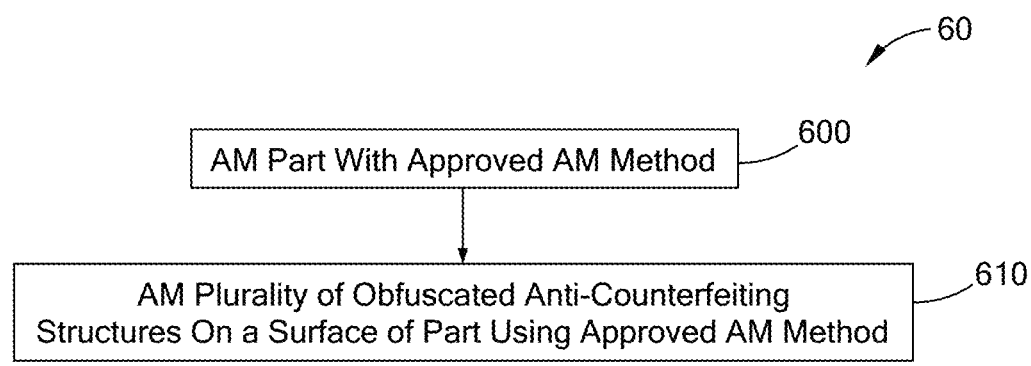
FIG. 8 is a flowchart for a method of additive manufacturing a component with obfuscated anti-counterfeit structures according to the teachings of the present disclosure.

Referring now to FIG. 8, a flowchart for a method 60 of forming additive manufactured parts is shown. The method 60 includes AM a part with an approved AM method at 600 and AM a plurality of obfuscated anti-counterfeiting structures on at least one surface of the part using the approved AM method at 610. Accordingly, the plurality of obfuscated anti-counterfeiting structures are properly formed on the at least one surface. In addition, forming of the plurality of obfuscated anti-counterfeiting structures on the at least one surface of the part prevents or allows detection of the part formed using an unapproved AM method. For example, inspection of the at least one surface on a part known to have (or should have) the obfuscated anti-counterfeiting structures formed thereon can provide information on the part such as whether or not the obfuscated anti-counterfeiting structures are present, and if present, have they been properly formed. If the obfuscated anti-counterfeiting structures are not present, then it can be determined that the part has not been made by the OEM or a licensed, approved, and/or designated contractor or supplier (i.e., the part is a counterfeit part). In the alternative, if the obfuscated anti-counterfeiting structures are present, then it can be determined whether or not the obfuscated anti-counterfeiting structures, and thus the part, have been formed with an approved AM method. And if the obfuscated anti-counterfeiting structures have been formed with an approved AM method (e.g., no defects present), then it can be determined that the part has been made by the OEM or a licensed, approved, and/or designated contractor or supplier. In the alternative, if the obfuscated anti-counterfeiting structures have not been formed with an approved AM method (e.g., defects are present), then it can be determined that the part has not been made by the OEM or a licensed, approved, and/or designated contractor or supplier (i.e., the part is a counterfeit part).

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of forming an additive manufactured part with obfuscated anti-counterfeiting features, the method comprising:
    additive manufacturing the part using an approved additive manufacturing method; and
    additive manufacturing a plurality of obfuscated anti-counterfeiting structures on a surface of the part using the approved additive manufacturing method, wherein:
    each of the plurality of obfuscated anti-counterfeiting structures comprises at least one of a prohibitive physical dimension and a prohibitive physical shape,
        the prohibitive physical dimension being a length, width, depth, or angle of orientation of an additive manufactured structure that is properly produced without defects with an approved additive manufacturing method and is improperly made with an unapproved additive manufacturing method,
        the prohibitive physical shape being a shape that is properly made without defects with an approved additive manufacturing method but is improperly made with an unapproved additive manufacturing method; and
    the plurality of obfuscated anti-counterfeiting structures is prohibitive from being formed without defects using at least one unapproved additive manufacturing method.

2. The method according to claim 1, wherein the prohibitive physical dimension is at least one of an average inner dimension of the plurality of obfuscated anti-counterfeiting structures, an average outer dimension of the plurality of obfuscated anti-counterfeiting structures, an average spacing between the plurality of obfuscated anti-counterfeiting structures, an average height of the plurality of obfuscated anti-counterfeiting structures, an average width of the plurality of obfuscated anti-counterfeiting structures, an average length of an unsupported section of the plurality of obfuscated anti-counterfeiting structures, and an average overhang angle of an unsupported section of the plurality of obfuscated anti-counterfeiting structures.

3. The method according to claim 1, wherein:
    the plurality of obfuscated anti-counterfeiting structures is a plurality of hollow structures,
    the approved additive manufacturing method is one of multi jet fusion, selective laser sintering, fused filament fabrication, direct metal laser melting, binder jetting, and material jetting, and
    the unapproved additive manufacturing method is one of continuous liquid interface production and stereolithography.

4. The method according to claim 3, wherein the prohibitive physical dimension is an average inner dimension between about 1 mm and about 5 mm, and the plurality of hollow structures is at least one of a plurality of hollow spheres, a plurality of hollow cylinders, a plurality of hollow cones, and a plurality of hollow polyhedral.

5. The method according to claim 4, wherein the prohibitive physical dimension is an average wall thickness between about 1 mm and about 5 mm.

6. The method according to claim 1, wherein:
    the plurality of obfuscated anti-counterfeiting structures is a plurality of solid structures,
    the approved additive manufacturing method is one of multi jet fusion, fused filament fabrication, binder jetting, and material jetting, and
    the unapproved additive manufacturing method is selective laser sintering and direct metal laser melting.

7. The method according to claim 6, wherein the prohibitive physical dimension is an average outer dimension between about 5 mm and about 10 mm.

8. The method according to claim 6, wherein the plurality of solid structures is at least one of a plurality of solid spheres, a plurality of solid cylinders, a plurality of solid cones, and a plurality of solid polyhedra.

9. The method according to claim 6, wherein the prohibitive physical dimension is an average spacing between adjacent solid structures between about 5 mm and about 25 mm.

10. The method according to claim 1, wherein:
    the plurality of obfuscated anti-counterfeiting structures is a plurality of truss structures,
    the approved additive manufacturing method is one of multi jet fusion, selective laser sintering, binder jetting, high speed sintering, and
    the unapproved additive manufacturing method is one of fused filament fabrication, stereolithography, and direct metal laser melting.

11. The method according to claim 10, wherein the prohibitive physical dimension is an average height between about 1 mm and about 3 mm.

12. The method according to claim 1, wherein the plurality of obfuscated anti-counterfeiting structures comprises at least two of a plurality of hollow structures, a plurality of solid structures, and a plurality of truss structures.

13. The method according to claim 12, wherein the unapproved additive manufacturing method includes at least two unapproved additive manufacturing methods.

14. The method according to claim 13, wherein the plurality of obfuscated anti-counterfeiting structures is a plurality of hollow structures and a plurality of truss structures.

15. The method according to claim 1, wherein the surface of the part is a B-surface of the part, a B-surface being a surface which is not visible during use of the part.

16. A method of forming additive manufactured parts with obfuscated anti-counterfeiting features, the method comprising:
    additive manufacturing a plurality of parts using an approved additive manufacturing method, wherein the additive manufacturing comprises forming a plurality of obfuscated anti-counterfeiting structures on a surface of each of the plurality of parts, wherein:
    each of the plurality of obfuscated anti-counterfeiting structures comprises at least one of a prohibitive physical dimension and a prohibitive physical shape,
        the prohibitive physical dimension being a length, width, depth, or angle of orientation of an additive manufactured structure that is properly produced without defects with an approved additive manufacturing method method and is improperly made with an unapproved additive manufacturing method, the prohibitive physical shape being a shape that is properly made without defects with an approved AM method but is improperly made with an unapproved AM method; and the plurality of obfuscated anti-counterfeiting structures is prohibitive from being formed without defects using at least one unapproved additive manufacturing method.

17. The method according to claim 16, wherein the plurality of obfuscated anti-counterfeiting structures is at least one of:
- a plurality of hollow structures with the prohibitive physical dimension being an average inner dimension between about 1 mm and about 5 mm,
- a plurality of solid structures with the prohibitive physical dimension being an average outer dimension between about 5 mm and about 10 mm, and
- a plurality of truss structures with the prohibitive physical dimension is an average height between about 5 mm and about 10 mm.

18. The method according to claim 17, wherein the surface is a B-surface, a B-surface being a surface which is not visible during use of the part.

19. A method of forming additive manufactured parts with obfuscated anti-counterfeiting features, the method comprising:
- additive manufacturing a plurality of parts using at least one approved additive manufacturing method such that each of the plurality of parts comprises a surface with a plurality of obfuscated anti-counterfeiting structures, wherein:
  - the plurality of obfuscated anti-counterfeiting structures comprises at least two of a plurality of hollow structures, a plurality of solid structures, and a plurality of truss structures,
  - each of the plurality of obfuscated anti-counterfeiting structures comprises at least one of a prohibitive physical dimension and a prohibitive physical shape, and
  - the plurality of obfuscated anti-counterfeiting structures is prohibitive from being formed using at least one unapproved additive manufacturing method such that counterfeit manufacture of the plurality of parts using at least two unapproved additive manufacturing methods is detected by inspecting the surface or observing a build failure by the at least one unapproved additive manufacturing method.

20. The method according to claim 19, wherein the plurality of obfuscated anti-counterfeiting structures is at least two of:
- a plurality of hollow structures with the prohibitive physical dimension is being an average inner dimension between about 1 mm and about 5 mm,
- a plurality of solid structures with the prohibitive physical dimension being an average outer dimension between about 5 mm and about 10 mm, and
- a plurality of truss structures with the prohibitive physical dimension being an average height between about 5 mm and about 10 mm.

* * * * *